United States Patent
Stiers

(10) Patent No.: US 9,635,081 B2
(45) Date of Patent: *Apr. 25, 2017

(54) RETRIEVAL AND DISPLAY OF RELATED CONTENT USING TEXT STREAM DATA FEEDS

(71) Applicant: MobiTV, Inc., Emeryville, CA (US)

(72) Inventor: Todd Stiers, Berkeley, CA (US)

(73) Assignee: MobiTV, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/639,554

(22) Filed: Mar. 5, 2015

(65) Prior Publication Data

US 2015/0229686 A1 Aug. 13, 2015

Related U.S. Application Data

(63) Continuation of application No. 12/708,350, filed on Feb. 18, 2010, now Pat. No. 8,996,496.

(51) Int. Cl.
  G06F 17/30 (2006.01)
  H04L 29/06 (2006.01)
  H04L 29/08 (2006.01)

(52) U.S. Cl.
  CPC ........ H04L 65/60 (2013.01); G06F 17/30029 (2013.01); G06F 17/30038 (2013.01); G06F 17/3082 (2013.01); G06F 17/30867 (2013.01); H04L 67/10 (2013.01); Y10S 707/914 (2013.01)

(58) Field of Classification Search
  CPC ..... H04L 65/60; H04L 67/10; G06F 17/3082; G06F 17/30867; G06F 17/30029; G06F 17/30038; Y10S 707/914
  See application file for complete search history.

(56) References Cited

U.S. PATENT DOCUMENTS

| 6,510,406 | B1 | 1/2003 | Marchisio |
| 6,910,030 | B2 * | 6/2005 | Choi et al. |
| 2003/0218696 | A1 * | 11/2003 | Bagga et al. ................. 348/700 |
| 2003/0221198 | A1 | 11/2003 | Sloo |

(Continued)

FOREIGN PATENT DOCUMENTS

DE    112011100612 T8    7/2013

OTHER PUBLICATIONS

Platzer, A Vector Space Search Engine for Web Services, Proceedings of the Third European Conference on Web Services (ECOWS'05), 2005, pp. 1-9.*

(Continued)

*Primary Examiner* — Albert Phillips, III

(74) *Attorney, Agent, or Firm* — Kwan & Olynick LLP

(57) ABSTRACT

Mechanisms are provided for retrieving and presenting related content using text stream data feeds. Text stream data feeds such as caption information associated with media content or conversations associated with social networking applications are aggregated and used to retrieve related media content, text documents, and advertisements. Text stream data feeds that a user is exposed to may indicate that the user is interested or at least primed for particular types of related content. In particular examples, an inverse vector space search engine is used to determine particular pieces of related content and categories of interest. Post filtering may also be applied to the results.

17 Claims, 7 Drawing Sheets

(56) References Cited

U.S. PATENT DOCUMENTS

| | | |
|---|---|---|
| 2006/0129917 A1 | 6/2006 | Volk et al. |
| 2007/0174340 A1 | 7/2007 | Gross |
| 2008/0021976 A1 | 1/2008 | Chen et al. |
| 2008/0034058 A1 | 2/2008 | Korman et al. |
| 2008/0183681 A1* | 7/2008 | Messer et al. ............ 707/3 |
| 2008/0281832 A1 | 11/2008 | Pulver et al. |
| 2009/0164301 A1 | 6/2009 | O'Sullivan et al. |
| 2009/0300680 A1* | 12/2009 | Cook et al. ............ 725/44 |
| 2010/0205169 A1 | 8/2010 | Narayan et al. |
| 2011/0179002 A1 | 7/2011 | Dumitru et al. |

OTHER PUBLICATIONS

"U.S. Appl. No. 12/708,350, Final Office Action mailed Aug. 13, 2014".

"U.S. Appl. No. 12/708,350, Non Final Office Action mailed Jan. 6, 2014".

"U.S. Appl. No. 12/708,350, Non Final Office Action mailed Nov. 23, 2012".

"U.S. Appl. No. 12/708,350, Notice of Allowance mailed Dec. 9, 2014".

"U.S. Appl. No. 12/708,350, Response filed Feb. 25, 2013 to Non Final Office Action mailed Nov. 23, 2012".

"International Application Serial No. PCT/US2011/025336, Int'l Preliminary Report on Patentability mailed Aug. 30, 2012".

"United Kingdom Application Serial No. 1214631.2 office Action mailed Feb. 19, 2014".

"United Kingdom Application Serial No. 1214631.2, Office Action mailed Jul. 17, 2013".

"United Kingdom Application Serial No. 1214631.2, Office Action mailed Oct. 2, 2012".

"United Kingdom Application Serial No. 1214631.2, Response filed Dec. 3, 2012 to Office Action mailed Oct. 2, 2012".

* cited by examiner

| | Vector Space Search Engine Matrix 221 | | | | | | |
|---|---|---|---|---|---|---|---|
| | alice | bob | like | eat | cat | bird | fish | distance |
| Document 201 | 0 | 1 | 0 | 1 | 1 | 1 | 2 | 2.24 |
| Document 203 | 1 | 0 | 1 | 0 | 1 | 0 | 0 | 2 |
| Document 205 | 0 | 1 | 0 | 1 | 0 | 0 | 1 | 1.41 |
| Document 207 | 0 | 0 | 0 | 1 | 1 | 1 | 0 | 2 |
| Document 209 | 1 | 1 | 1 | 0 | 0 | 1 | 1 | 1.41 |
| Document 211 | 1 | 0 | 1 | 0 | 0 | 0 | 0 | 2 |
| Totals | 3 | 3 | 3 | 3 | 3 | 3 | 4 | |

| | alice | bob | like | eat | cat | bird | fish |
|---|---|---|---|---|---|---|---|
| Search 213 | 0 | 0 | 1 | 1 | 0 | 0 | 1 |

Figure 2A

| | Inverse Vector Space Search Engine Matrix 271 | | | | | | |
|---|---|---|---|---|---|---|---|
| | finance | baseball | cartoon | animation | car | symphony | science | planet |
| Content 251 | 0 | 1 | 0 | 1 | 1 | 1 | 0 | 1 |
| Content 253 | 1 | 0 | 1 | 0 | 1 | 0 | 0 | 0 |
| Content 255 | 0 | 0 | 1 | 1 | 0 | 0 | 1 | 1 |
| Content 257 | 0 | 0 | 0 | 1 | 1 | 1 | 0 | 0 |
| Content 259 | 0 | 0 | 1 | 0 | 0 | 1 | 1 | 1 |
| Content 261 | 1 | 1 | 1 | 0 | 0 | 0 | 0 | 1 |
| Content 263 | 1 | 0 | 1 | 0 | 0 | 0 | 1 | 1 |

| Search | 0 | 0 | 1 | 1 | 0 | 0 | 1 | 1 |

Figure 2B

RETRIEVAL AND DISPLAY OF RELATED CONTENT USING TEXT STREAM DATA FEEDS

CROSS-REFERENCE TO RELATED APPLICATIONS

This application is a continuation of and claims priority to U.S. patent application Ser. No. 12/708,350, filed Feb. 18, 2010 by Todd Stiers, titled "Retrieval And Display Of Related Content Using Text Stream Data Feeds", which is incorporated herein by reference in its entirety and for all purposes.

DESCRIPTION OF RELATED ART

The present disclosure relates to techniques and mechanisms for retrieval and display of related content using text stream data feeds.

DESCRIPTION OF RELATED ART

Identifying content of interest to a user is a difficult and imperfect task. In some examples, shopping related sites will suggest new products based on user historical viewing and purchase activity. Other sites will provide advertisements based on text entered for a query or the content being viewed. However, mechanisms for identifying content of interest are limited.

Consequently, the techniques and mechanisms of the present invention provide additional improved mechanisms for retrieval and display of related content, particularly retrieval and display of related content using text stream data feeds.

OVERVIEW

Mechanisms are provided for retrieving and presenting related content using text stream data feeds. Text stream data feeds such as caption information associated with media content or conversations associated with social networking applications are aggregated and used to retrieve related media content, text documents, and advertisements. Text stream data feeds that a user is exposed to may indicate that the user is interested or at least primed for particular types of related content. In particular examples, an inverse vector space search engine is used to determine particular pieces of related content and categories of interest. Post filtering may also be applied to the results.

These and other features of the present invention will be presented in more detail in the following specification of the invention and the accompanying figures, which illustrate by way of example the principles of the invention.

BRIEF DESCRIPTION OF THE DRAWINGS

The disclosure may best be understood by reference to the following description taken in conjunction with the accompanying drawings, which illustrate particular embodiments of the present invention.

FIG. 2A illustrates a particular example of a vector space search engine.

FIG. 2B illustrates a particular example of an inverse vector space search engine.

DESCRIPTION OF PARTICULAR EMBODIMENTS

Figure 1:
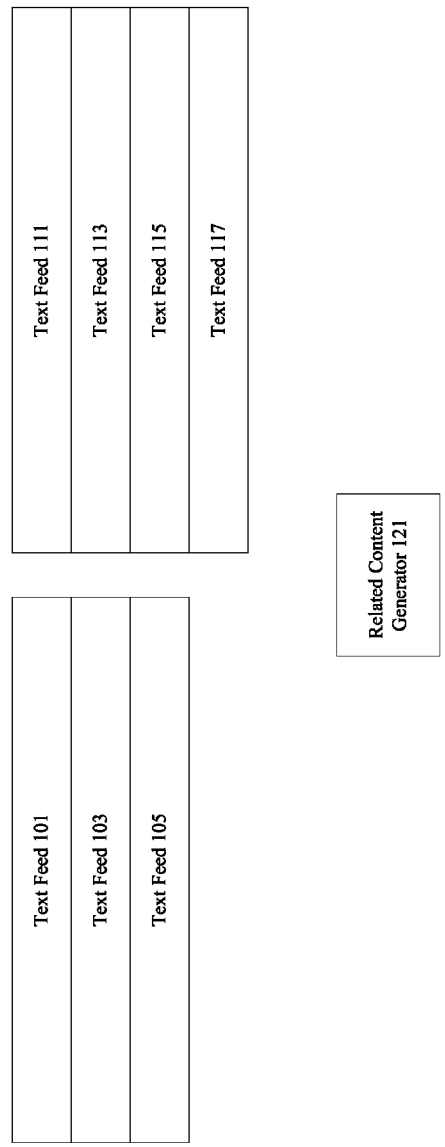
FIG. 1 illustrates a particular example of a text stream data feed.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of particular types of text feeds. However, it should be noted that the techniques and mechanisms of the present invention can be used to identify related content for a variety of types of text feeds. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a processor is used in a variety of contexts. However, it will be appreciated that multiple processors can also be used while remaining within the scope of the present invention unless otherwise noted. Furthermore, the techniques and mechanisms of the present invention will sometimes describe two entities as being connected. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Identifying content for presentation to a user is a difficult task. Some content providers will select material based on user interest, profile, and demographic information. Some retailers will identify what a user has purchased and recommend similar products, or products purchased by others who have the same purchasing pattern. Other sites will select advertising based on what a user has written in an email or what sites the user has viewed in the past. These mechanisms identify content of interest with some degree of accuracy. However, all of these mechanisms are still limited. The techniques of the present invention provide additional mechanisms for determining content of interest.

Text stream data feeds provide a wealth of information relating to what a user has viewed or may be interested in viewing. Text stream data feeds include caption information associated with media, text streams from social networking sites, and other real-time data streams. According to various embodiments, caption information is aggregated and used to search for related content of interest. In particular embodiments, caption information is used to identify particularly relevant advertising that can be presented to the user in real-time. It is recognized that in some instances, a user may not necessarily be interested in the material corresponding to the captions, but the user is at least primed by the material viewed. In still other embodiments, data from a social networking data feed is used to identify media content for presentation to a user watching a particular television program or movie on a mobile phone. The user may not necessarily be interacting on the social networking site, but the material may be relevant to user interests. In other examples, most frequently discussed topics on social networking sites or most frequently blogged topics may be used to identify media content for presentation to a user.

A "vector space search engine" (VSSE) is a tool/mechanism used in many modern search engines. In this technique, each page or document is entered into the search engine as a vector, where each unique word becomes a column in a matrix common to the entire data set represented by all of the pages and documents. Each occurrence of each unique word indexes that column, and each document entry can be considered a row. Natural language processing tricks are applied to reduce the number of columns (and corresponding dimensions) in the vector space search engine matrix. Punctuation and symbols are usually stripped, capitalization is removed, plurals/common forms of words are used and some words are even blacklisted so that they are not included in the VSSE matrix. It is often desirable to minimize the size of the matrix, as storage and processing resources required can become enormous.

Like the page and/or document vectors, a query is processed as a vector in the space defined by the data set. The actual search is performed by finding the minimal multi-dimensional distance between the search vector and the page and/or document vectors. Page and/or document vectors that are closest to the search query vector are ranked higher as a closer match. Euclidean geometry and linear algebra can be used to determine distance between vectors.

According to various embodiments, it is recognized that a VSSE can be used not only to search pages or data, but can be used to identify relevant or related content of interest. Content may include media, product information, text, etc. It is recognized that an inverse VSSE (IVSSE) can be used. Each row of an IVSSE can represent a particular piece of content or a content type. Keywords that may be associated with various categories are provided as columns. For example, row headers may include different video clips. Column headers may include celebrity names, movie titles, products, locations, sports teams, emotions, hobbies, etc. Words, phrases, and all types of data that somehow describe different types of content could be included, but keywords are used here for simplicity.

To determine the content matches for a particular text stream, information from the text stream is used to construct the search vector, which is then matched for closeness to existing content. According to various embodiments, a ranked list of content is returned, where the category vectors closest to the search vector are determined to be the most relevant content.

A final filtering or negative search of results can be applied to define explicitly inappropriate content. For example, explicit words can be defined to keep a piece of content from being suggested to children.

According to various embodiments, a streaming server receiving content from multiple sources can automatically identify content of interest for users based on text streams associated with the particular users. New content can be dynamically generated and added as text streams associated with the users are analyzed. Multiple categorize or recategorize content using an IVSSE. Content can be categorized even if no description is provided. Media streams can be categorized using metadata such as caption information or review information. New categories may be dynamically generated and added. Multiple candidate media clips for a media stream may be provided.

FIG. 1 illustrates an example of multiple text streams that can be used to identify content of interest. According to various embodiments, text streams from multiple sources can be provided to a related content generator 121. In particular embodiments, text feed portions 101, 103, and 105 corresponding to caption information in a media program are provided to a related content generator 121. In particular embodiments, text feed portions 111, 113, 115, and 117 from a social networking application associated with the user are also provided to the related content generator 123. The text feed portions may be aggregated into a single query that is fed into related content generator search engine. Each text feed portion 111, 113, 115, and 117 may represent an individual statement or line in a caption. According to various embodiments, a search query is built from a text stream and run against a video or other search index to generate results that can be presented in a user interface as options for the user.

By supporting a passive user interface (UI), content can be suggested in an environment where a user can view program related to social media interaction or popular topics. When a friend posts a link or comments on an interesting topic, a user may be more likely to follow-up if a single click versus a separate effort is required. Streamlining these efforts is particular important on mobile devices. The scope and depth of content libraries is made available to the user without manual browsing or search, and content suggestions can be driven in real time. In other examples, content that a user is primed for is suggested after using captions in search queries. A television show having recently discussed environmentally friendly habits may prime a user for green product related commercials. A related content generator can determine what a user has just viewed in a dynamic manner and identify pertinent content including appropriate advertisements.

FIG. 2A illustrates one example of a vector space search engine (VSSE). Vector space search engines and related mechanisms can be used to implement the techniques and mechanisms of the present invention. According to various embodiments, each document and/or page corresponds to a row in the VSSE matrix 221. Each word or keyword in the data set corresponds to a column in the VSSE matrix. When a word or derivative of the word occurs in a document and/or page, the value in the VSSE matrix is incremented. In particular embodiments, document 201 includes the words bob, eat, cat, bird, fish. Document 203 includes the words alice, like, and cat. Document 205 includes the words bob, eat, and fish. Document 207 includes the words cat, eat, and bird. Document 209 includes the words bird, like, and fish. Document 211 includes the words alice, like, and bob. According to various embodiments, a VSSE matrix may be very sparse with numerous rows corresponding to numerous documents and other data groupings in a search space and columns corresponding to numerous words and other data included in the documents.

According to various embodiments, a variety of natural language techniques can be applied to reduce the size of a VSSE matrix. Groups of words or phrases can also be included in a single column. It is desirable to minimize the number of columns for performance, space and processing resources required can become enormous. A search query can be structured as a vector in the space defined by the data set.

The actual search is performed by finding the minimal multi-dimensional distance between the search vector and the page and/or document vectors. Page and/or document vectors that are closest to the search query vector are ranked higher as a closer match. The Pythagorean Theorem as well as optimized linear algebra techniques can be used to find the closest distance between search and document vectors.

In particular embodiments, a search query may be "who likes to eat fish." The search vector 213 is populated with the search terms and the distance between the search vector and the various document vectors is determined. According to various embodiments, the distances between the search vector and the document vectors are determined to be 2.24, 2, 1.41, 2, 1.41, and 2 for documents 201, 203, 205, 207, 209 and 211 respectively.

FIG. 2B illustrates one example of an inverse vector space search engine (IVSSE). A variety of applications require users or content providers to identify related content. It is often difficult to automatically identify related content.

In particular embodiments, an IVSSE 271 includes rows corresponding to content. Rows may include content 251, 253, 255, 257, 259, 261, and 263. Columns in the IVSSE may include keywords associated with description for media content. Keywords may include finance, baseball, cartoon, animation, car, symphony, science, and planet. In one example, a text stream is received. The text stream includes the keywords cartoon, animation, science, and planet in its description and/or captions. The keywords are used to select content 255 based on the distance between the text stream vector and the content 255 vector. Secondary and tertiary content can also be identified based on vector distances.

Figure 3:
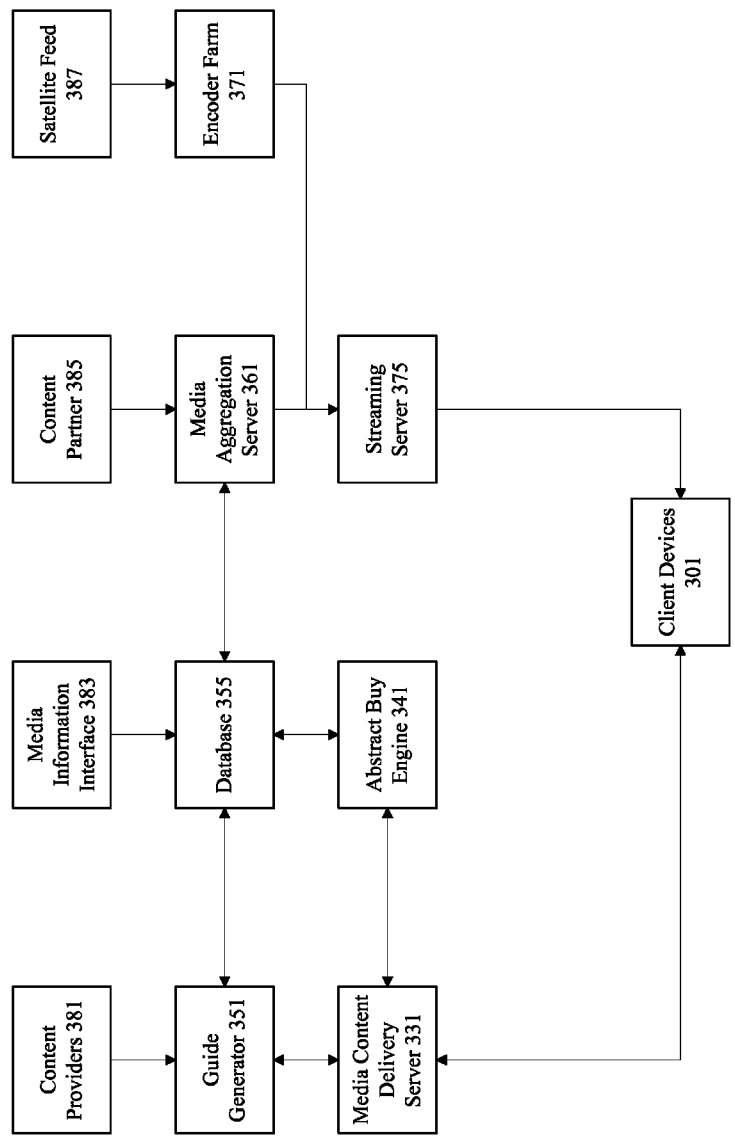
FIG. 3 illustrates a network that can use an inverse vector space search engine.

FIG. 3 is a diagrammatic representation showing one example of a network that can use the techniques of the present invention. According to various embodiments, media content is provided from a number of different sources 385. Media content may be provided from film libraries, cable companies, movie and television studios, commercial and business users, etc. and maintained at a media aggregation server 361. Any mechanism for obtaining media content from a large number of sources in order to provide the media content to mobile devices in live broadcast streams is referred to herein as a media content aggregation server. The media content aggregation server 361 may be clusters of servers located in different data centers. According to various embodiments, content provided to a media aggregation server 361 is provided in a variety of different encoding formats with numerous video and audio codecs. Media content may also be provided via satellite feed 357. According to various embodiments, media content is categorized by using an IVSSE.

An encoder farm 371 is associated with the satellite feed 387 and can also be associated with media aggregation server 361. The encoder farm 371 can be used to process media content from satellite feed 387 as well as from media aggregation server 361 into potentially numerous encoding formats. According to various embodiments, file formats include open standards MPEG-1 (ISO/IEC 11172), MPEG-2 (ISO/IEC 13818-2), MPEG-4 (ISO/IEC 14496), as well as proprietary formats QuickTime™, ActiveMovie™, and RealVideo™. Some example video codecs used to encode the files include MPEG-4, H.263, and H.264. Some example audio codecs include Qualcomm Purevoice™ (QCELP), The Adaptive Multi—Narrow Band (AMR-NB), Advanced Audio coding (AAC), and AACPlus. The media content may also be encoded to support a variety of data rates. The media content from media aggregation server 361 and encoder farm 371 is provided as live media to a streaming server 375. In one example, the streaming server is a Real Time Streaming Protocol (RTSP) server 375. Media streams are broadcast live from an RTSP server 375 to individual client devices 301. A variety of protocols can be used to send data to client devices.

Possible client devices 301 include personal digital assistants (PDAs), cellular phones, smartphones, personal computing devices, personal computers etc. According to various embodiments, the client devices are connected to a cellular network run by a cellular service provider. In other examples, the client devices are connected to an Internet Protocol (IP) network. Alternatively, the client device can be connected to a wireless local area network (WLAN) or some other wireless network. Live media streams provided over RTSP are carried and/or encapsulated on one of a variety of wireless networks.

The client devices are also connected over a wireless network to a media content delivery server 331. The media content delivery server 331 is configured to allow a client device 301 to perform functions associated with accessing live media streams. For example, the media content delivery server allows a user to create an account, perform session identifier assignment, subscribe to various channels, log on, access program guide information, obtain information about media content, etc. According to various embodiments, the media content delivery server does not deliver the actual media stream, but merely provides mechanisms for performing operations associated with accessing media. In other implementations, it is possible that the media content delivery server also provides media clips, files, and streams. The media content delivery server is associated with a guide generator 351. The guide generator 351 obtains information from disparate sources including content providers 381 and media information sources 383. The guide generator 351 provides program guides to database 355 as well as to media content delivery server 331 to provide to client devices 301.

According to various embodiments, the guide generator 351 obtains viewership information from individual client devices. In particular embodiments, the guide generation 351 compiles viewership information in real-time in order to generate a most-watched program guide listing most popular programs first and least popular programs last. The client device 301 can request program guide information and the most-watched program guide can be provided to the client device 301 to allow efficient selection of video content. According to various embodiments, guide generator 351 is connected to a media content delivery server 331 that is also associated with an abstract buy engine 341. The abstract buy engine 341 maintains subscription information associated with various client devices 301. For example, the abstract buy engine 341 tracks purchases of premium packages.

The media content delivery server 331 and the client devices 301 communicate using requests and responses. For example, the client device 301 can send a request to media content delivery server 331 for a subscription to premium content. According to various embodiments, the abstract buy engine 341 tracks the subscription request and the media content delivery server 331 provides a key to the client device 301 to allow it to decode live streamed media content. Similarly, the client device 301 can send a request to a media content delivery server 331 for a most-watched program guide for its particular program package. The media content delivery server 331 obtains the guide data from the guide generator 351 and associated database 355 and provides appropriate guide information to the client device 301.

Although the various devices such as the guide generator 351, database 355, media aggregation server 361, etc. are shown as separate entities, it should be appreciated that various devices may be incorporated onto a single server. Alternatively, each device may be embodied in multiple servers or clusters of servers. According to various embodiments, the guide generator 351, database 355, media aggregation server 361, encoder farm 371, media content delivery server 331, abstract buy engine 341, and streaming server 375 are included in an entity referred to herein as a media content delivery system.

Figure 4:
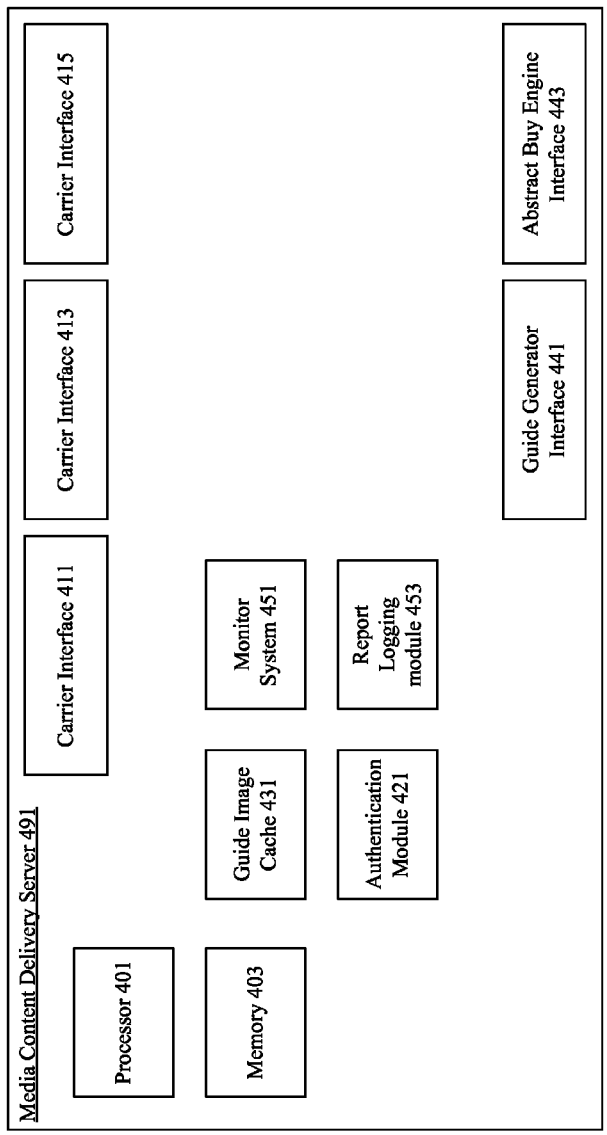
FIG. 4 illustrates one example of a media content delivery system.

FIG. 4 is a diagrammatic representation showing one example of a media content delivery server 491. According to various embodiments, the media content delivery server 491 includes a processor 401, memory 403, and a number of interfaces. In some examples, the interfaces include a guide generator interface 441 allowing the media content delivery server 491 to obtain program guide information. The media content delivery server 491 also can include a program guide cache 431 configured to store program guide information and data associated with various channels. The media content delivery server 491 can also maintain static information such as icons and menu pages. The interfaces also include a carrier interface 411 allowing operation with mobile devices such as cellular phones operating in a particular cellular network. The carrier interface allows a carrier vending system to update subscriptions. Carrier interfaces 413 and 415 allow operation with mobile devices operating in other wireless networks. An abstract buy engine interface 443 provides communication with an abstract buy engine that maintains subscription information.

An authentication module 421 verifies the identity of mobile devices. A logging and report generation module 453 tracks mobile device requests and associated responses. A monitor system 451 allows an administrator to view usage patterns and system availability. According to various embodiments, the media content delivery server 491 handles requests and responses for media content related transactions while a separate streaming server provides the actual media streams. In some instances, a media content delivery server 491 may also have access to a streaming server or operate as a proxy for a streaming server. But in other instances, a media content delivery server 491 does not need to have any interface to a streaming server. In typical instances, however, the media content delivery server 491 also provides some media streams. The media content delivery server 491 can also be configured to provide media clips and files to a user in a manner that supplements a streaming server.

Although a particular media content delivery server 491 is described, it should be recognized that a variety of alternative configurations are possible. For example, some modules such as a report and logging module 453 and a monitor 451 may not be needed on every server. Alternatively, the modules may be implemented on another device connected to the server. In another example, the server 491 may not include an interface to an abstract buy engine and may in fact include the abstract buy engine itself. A variety of configurations are possible.

Figure 5:
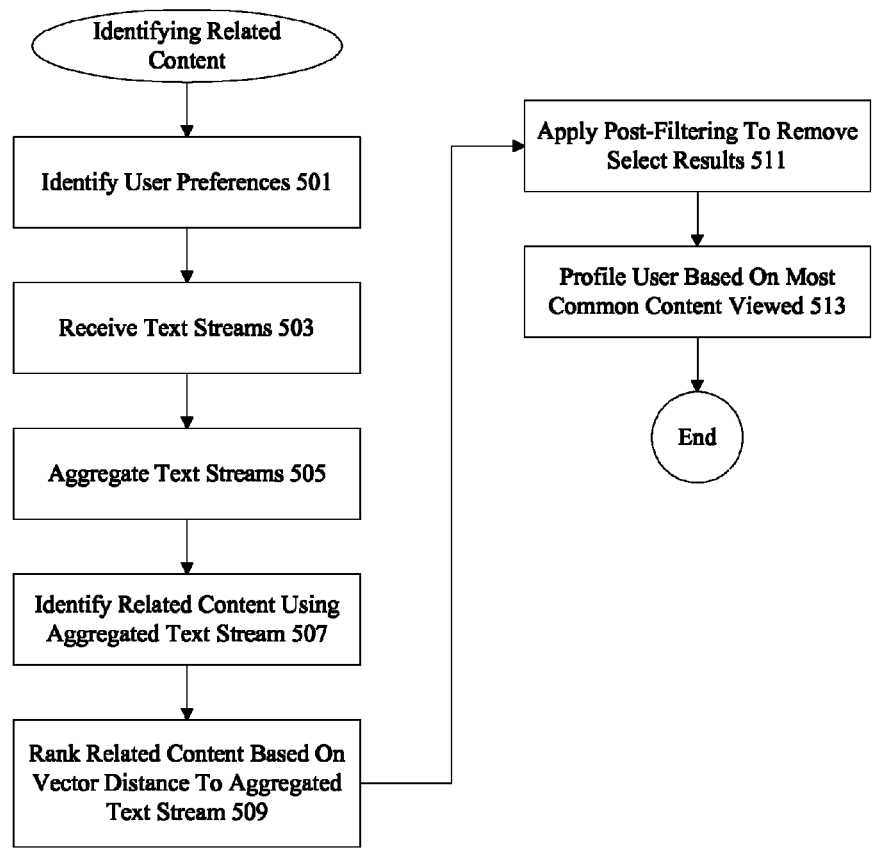
FIG. 5 illustrates a technique for generating related content.

FIG. 5 illustrates one example of a technique for identifying related content. At 501, user preferences are identified. According to various embodiments, identifying user preferences may include determine what sources to use in determining related content. In some examples, a user may indicate that a social networking text feed should be used to identify related content. A user may also indicate that most frequently discussed topics generally may be used to suggest content. In still other examples, caption information from a program being viewed by a user is evaluated to determine content of interest. In particular embodiments, caption information from programs being viewed by a user's friends and family is used to generate related content.

At 503, text streams are received from one or more sources and/or one or more media. In some examples, one text stream may be received from broadcast television, another text stream may be received from web content, and still another text stream may be received from a live news service. In particular embodiments, sources may include program captions, social networking feeds, search query term feeds, etc. At 505, text streams are aggregated to form search queries. In particular embodiments, natural language processing is used to identify appropriate boundaries or appropriate sentences to form search queries. In other embodiments, text streams are periodically sampled to form search queries. In still other examples, text obtained between scene changes is used to form search queries. At 507, related content is identified using aggregated text streams. In some examples, text streams from multiple sources are aggregated and fed into an IVSSE. At 509, related content is ranked based on vector distance to an aggregated text stream.

At 511, post-filtering is applied to remove select results. At 513, a user a profiled based on the most common content viewed.

Figure 6:
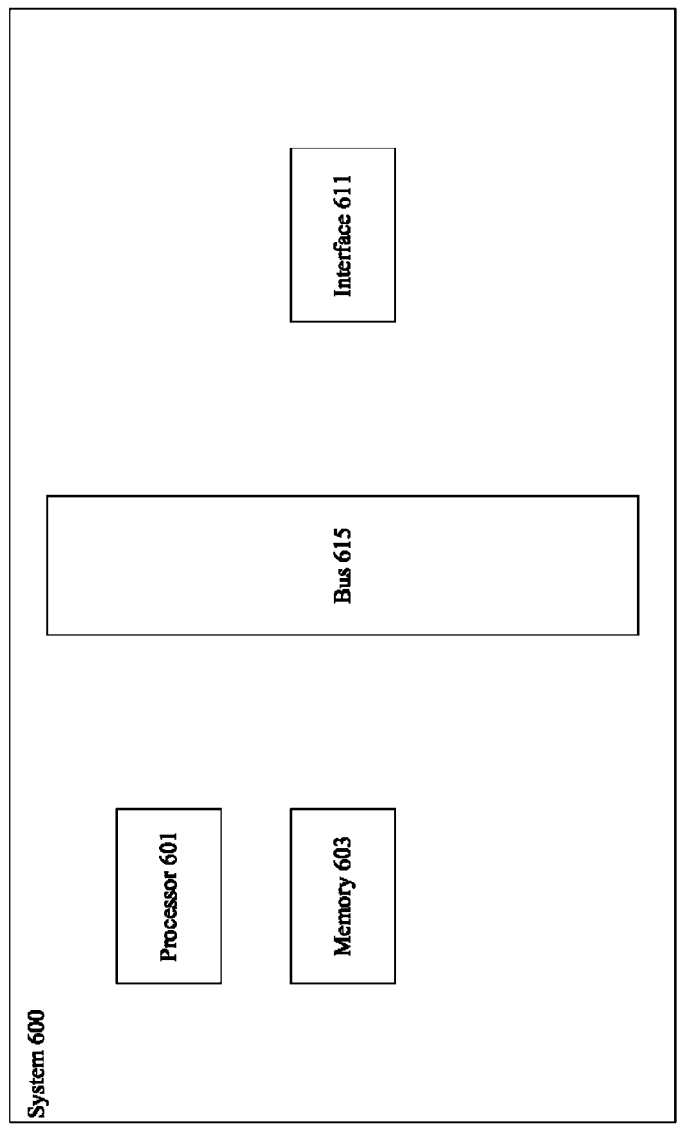
FIG. 6 illustrates a particular example of a computer system.

FIG. 6 illustrates one example of a server that can be used to perform categorization. According to particular embodiments, a system 600 suitable for implementing particular embodiments of the present invention includes a processor 601, a memory 603, an interface 611, and a bus 615 (e.g., a PCI bus or other interconnection fabric) and operates as a streaming server. When acting under the control of appropriate software or firmware, the processor 601 is responsible for modifying and transmitting live media data to a client. Various specially configured devices can also be used in place of a processor 601 or in addition to processor 601. The interface 611 is typically configured to end and receive data packets or data segments over a network.

Particular examples of interfaces supports include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to various embodiments, the system 600 is a content server that also includes a transceiver, streaming buffers, and a program guide database. The content server may also be associated with subscription management, logging and report generation, and monitoring capabilities.

In particular embodiments, functionality for allowing operation with mobile devices such as cellular phones operating in a particular cellular network and providing subscription management. According to various embodiments, an authentication module verifies the identity of devices including mobile devices. A logging and report generation module tracks mobile device requests and associated responses. A monitor system allows an administrator to view usage patterns and system availability. According to various embodiments, the content server 691 handles requests and responses for media content related transactions while a separate streaming server provides the actual media streams.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method comprising:
    transmitting a first media stream from a media aggregation server to a client machine via a communications interface, the first media stream being transmitted in response to a request for the first media stream in association with a content management account, the first media stream comprising one or more media content items, the first media stream comprising text information characterizing the one or more media content items;
    generating a vector space search vector via a processor at the media aggregation server, the vector space search vector being generated by aggregating the text information;
    selecting a designated media content item for the content management account based on the generated vector space search vector by determining a plurality distances between the search vector and a plurality of content vectors in an inverse vector space search engine matrix; and
    providing the designated media content item to the client machine.

2. The method of claim 1, the method further comprising: constructing a profile of the content management account based on a plurality of media content categories associated with the one or more media content items.

3. The method of claim 1, wherein generating the vector space search vector comprises aggregating social networking information, the social networking information being associated with a user linked with the content management account.

4. The method of claim 1, wherein the first media stream is a real-time video broadcast.

5. The method of claim 1, wherein generating the vector space search vector comprises aggregating information characterizing a plurality of websites, the plurality of websites having been visited by the client machine.

6. The method of claim 1, wherein providing the designated media content item to the client machine comprises transmitting to the client machine a recommendation identifying the designated media content item.

7. The method of claim 1, wherein the designated media content item comprises an advertisement.

8. The method of claim 1, wherein the text information includes caption information and social networking information, and wherein the caption information and the social networking information are aggregated upon reaching a threshold of words or characters.

9. The method of claim 1, wherein the one or more media content items includes video, and wherein the caption information is associated with the video.

10. The method of claim 9, wherein the caption information comprises a real-time data feed.

11. The method of claim 1, wherein the text information is aggregated upon detecting one of a plurality of keywords.

12. A media aggregation server comprising:
    a communications interface operable to transmit a first media stream to a client machine, the first media stream being transmitted in response to a request for the first media stream in association with a content management account, the first media stream comprising one or more media content items, the first media stream comprising text information characterizing the one or more media content items;
    a processor operable to generate a vector space search vector by aggregating the text information, to select a designated media content item for the content management account based on the generated vector space search vector by determining a plurality distances between the search vector and a plurality of content vectors in an inverse vector space search engine matrix, and to provide the designated media content item to the client machine.

13. The media aggregation server of claim 12, wherein the processor is further operable to construct a profile of the content management account based on a plurality of media content categories associated with the one or more media content items.

14. The media aggregation server of claim 12, wherein generating the vector space search vector comprises aggregating social networking information, the social networking information being associated with a user linked with the content management account.

15. The media aggregation server of claim 12, wherein the first media stream is a real-time video broadcast.

16. The media aggregation server of claim 12, wherein generating the vector space search vector comprises aggregating information characterizing a plurality of websites, the plurality of websites having been visited by the client machine.

17. One or more non-transitory computer readable media having instructions stored thereon for performing a method, the method comprising:
    transmitting a first media stream from a media aggregation server to a client machine via a communications interface, the first media stream being transmitted in response to a request for the first media stream in association with a content management account, the first media stream comprising one or more media content items, the first media stream comprising text information characterizing the one or more media content items;

generating a vector space search vector via a processor at the media aggregation server, the vector space search vector being generated by aggregating the text information;

selecting a designated media content item for the content management account based on the generated vector space search vector by determining a plurality distances between the search vector and a plurality of content vectors in an inverse vector space search engine matrix; and providing the designated media content item to the client machine.

* * * * *